Jan. 1, 1929.
C. J. ROCQUIN
1,697,289
GARDEN RAKE
Filed April 29, 1927
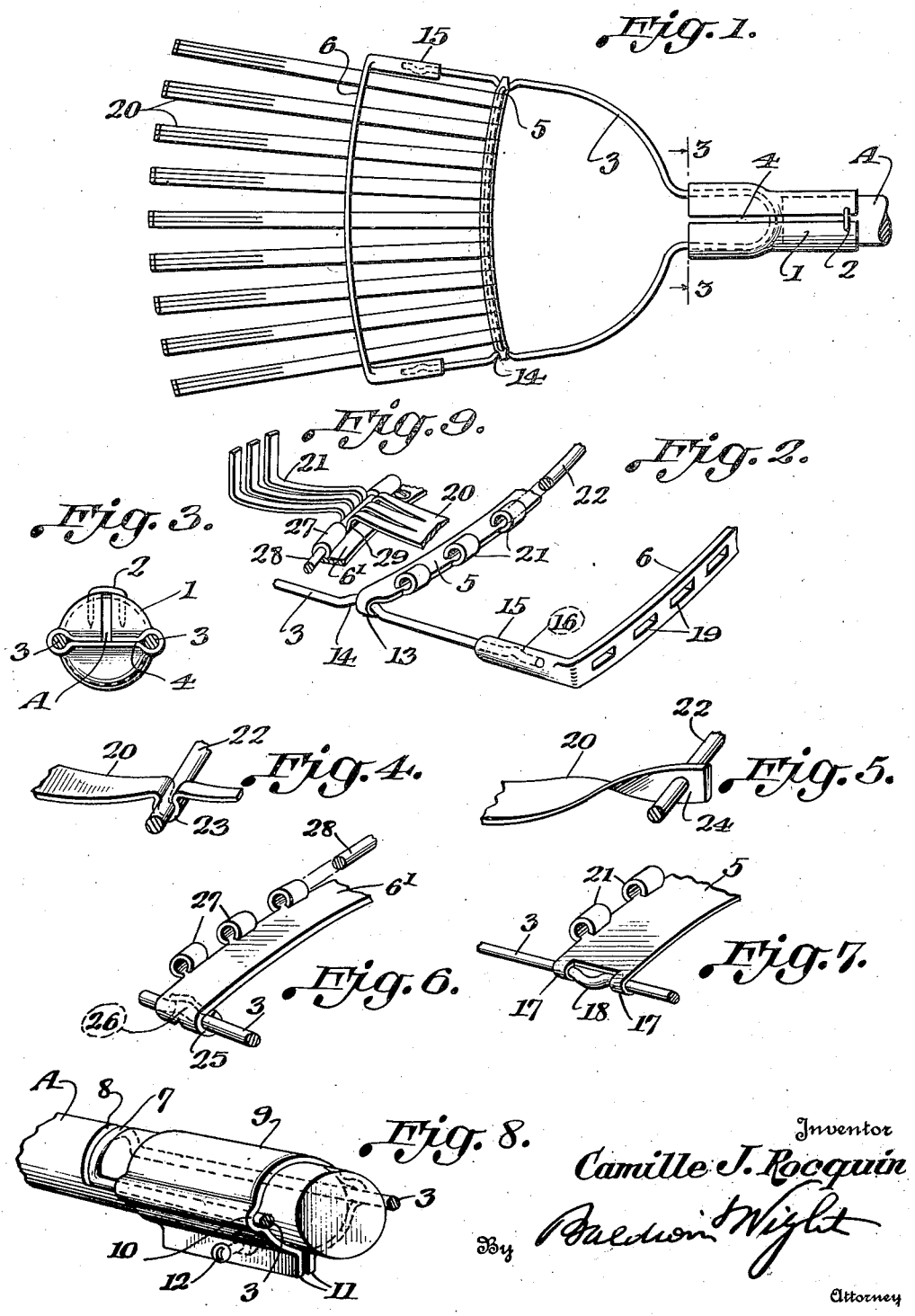
Inventor
Camille J. Rocquin
By Baldwin Wight
Attorney Patented Jan. 1, 1929.

1,697,289

UNITED STATES PATENT OFFICE.

CAMILLE J. ROCQUIN, OF NEW ORLEANS, LOUISIANA.

GARDEN RAKE.

Application filed April 29, 1927. Serial No. 187,461.

This rake is of that type in which substantially all portions thereof except the handle are made of sheet metal and in which the separate teeth are made readily detachable in order that if a tooth becomes broken, it may become replaced. In the construction of the present invention, any broken part may be replaced and due to the construction thereof from sheet metal it may be manufactured at low cost. Other features of the invention will be apparent from the following detailed description and the appended claim.

In the drawings:

Figure 1 is a top plan view of one form of rake.

Figure 2 is a detail elevation of a part of Figure 1.

Figure 3 is a section on the line 3—3 of Figure 1.

Figure 4 is a view of one form of holding means for the rear ends of the tines.

Figure 5 is a view of an alternative construction.

Figure 6 shows a modified form of front holding member.

Figure 7 shows a modification of the rear holding member.

Figure 8 shows a modified form of attaching the frame to the wooden handle.

Figure 9 shows a modified form of engagement between the front guide member and the tines.

In the form of the invention disclosed in Figures 1, 2 and 3, the ordinary wooden handle A is inserted at one end into a tubular sheet metal member 1 which is split on one side and may be fastened to the handle A by a staple 2. The frame member 3 is a soft or tempered steel bar bent into the form shown in Figure 1. The inner bent portion of this rod is inserted into the tubular member 1 and the metal is bent down as shown at 4 in order to prevent relative movement between the tubular member and the frame member 3. The frame member 3 carries a rear supporting member or device 5 and a front supporting member or device 6.

The handle and frame may be connected by the modified construction shown in Figure 8 in which the rear end of the frame member 3 is bent into a semi-circular portion 7 which rests in a groove 8 in the wooden handle. A split metal sleeve 9 is provided at its sides with enlargements 10 to receive the side members 3 of the frame and this sleeve also has ears 11 which are drawn together by means of screws or similar fastenings 12. In this manner by a very slight clamping action the handle A will be attached to the rake frame.

In the form shown in Figures 1 and 2 the rear member 5 is attached to the frame by bending the ends 13 of this member into depressed portions 14 of the frame 3. This prevents accidental disengagement and also prevents movement of one member relative to the other.

In the form shown in Figures 1 and 2 the front member 6 is attached to the frame 3 by bending the ends of the member 6 into tubular form as indicated at 15 which telescope over the free ends of the member 3. These end portions may be provided with a bend 16 to cause a tight fit between the parts or if desired the middle of the part 15 may be forced into the bend 16.

An alternative form of fastening for the rear member 5 is shown in Figure 7 in which this member is provided with two spaced ears 17 at each end which are bent into substantially tubular form around the frame member 3 which is provided with a bent portion 18 lying between the two ears 17 and thus preventing relative longitudinal movement of the parts when assembled.

The tines each comprise a body portion 20 and at their outer end they may be split into a plurality of fingers 21 as shown clearly in Figure 9. The tines may be attached to the rear frame member 5 in various ways. In the form shown in Figure 2, the frame member 5 has at one edge a plurality of ears 21 which are bent into substantially cylindrical form and through which passes a holding rod 22. The rear ends of the tines are bent similarly into substantially cylindrical portions which fit between the portions 21 and through which the holding rod 22 also passes. After insertion, the ends of this rod may be bent or other means provided to prevent accidental displacement thereof or to permit removal when it is desired to replace a broken tine. In the form shown in Figure 4 the rear end of each tine has a bend 23 which fits between the ears 21 and in which the rod 22 engages. In the form shown in Figure 5, the rear end of each tine is bent into a plane at right angles to the body thereof and this portion is provided with an opening through which passes the rod 22.

The manner in which the front holding and guide member 6 is attached to the frame may also be varied and a modified form is shown in Figure 6, in which the front member 6' is substantially flat and is provided at each end with an ear 25 bent into tubular form and embracing a bent portion 26 of the frame member 3. This front member 6' has ears 27 at one edge corresponding in form and function to the ears 21 of Figure 2 and through these ears passes a holding rod 28 shown in Figure 9. In the form shown in Figure 2 the tines are held intermediate their ends by passing through openings 19 in the member 6. In the form shown in Figures 6 and 7 the tines are provided intermediate their ends with a semi-circular bend 29 which fits in the space between two adjacent ears 27 and in which bend lies the rod 28. In this form the tines are not only held against sidewise movement but against forward and rearward movement. Instead of bending the tines, they may lie flat upon the face of the member 6' and the rod 28 will be in substantial engagement with their upper surfaces.

It will be obvious that the disclosure shows numerous detailed constructions for carrying out the desired idea and it is further obvious that other changes may be made without departing from the spirit of the invention. It is, therefore, desired to emphasize the fact that the invention is to be regarded as limited only by the scope of the appended claim.

I claim as my invention:

A rake comprising a frame having sides, separate front and rear guiding and holding members connecting said sides, one of said members having a plurality of spaced tubular ears, a wire passing through said ears, and a tine having a portion held against sidewise displacement by said ears and against displacement in other directions by engagement with said wire and the body of said member.

In testimony whereof, I have hereunto subscribed my name.

CAMILLE J. ROCQUIN.